(12) United States Patent
Komatsu et al.

(10) Patent No.: US 9,507,154 B2
(45) Date of Patent: Nov. 29, 2016

(54) VIRTUAL IMAGE DISPLAY APPARATUS

(71) Applicant: SEIKO EPSON CORPORATION, Tokyo (JP)

(72) Inventors: Akira Komatsu, Tatsuno-machi (JP); Takahiro Totani, Suwa (JP); Masayuki Takagi, Matsumoto (JP); Takashi Takeda, Suwa (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/555,975

(22) Filed: Nov. 28, 2014

(65) Prior Publication Data

US 2015/0160460 A1    Jun. 11, 2015

(30) Foreign Application Priority Data

Dec. 6, 2013  (JP) .................. 2013-252756

(51) Int. Cl.
*G02B 27/14* (2006.01)
*G02B 27/01* (2006.01)
*G02B 17/08* (2006.01)

(52) U.S. Cl.
CPC ....... *G02B 27/0172* (2013.01); *G02B 17/0856* (2013.01); *G02B 2027/0116* (2013.01)

(58) Field of Classification Search
CPC .. G02B 3/0043; G02B 3/005; G02B 3/0056; G02B 3/0062; G02B 27/0172; G02B 3/0116; G02B 3/0856
USPC .................................................. 359/629–633
See application file for complete search history.

(56) References Cited

U.S. PATENT DOCUMENTS

| | | | |
|---|---|---|---|
| 5,886,822 A | 3/1999 | Spitzer | |
| 2005/0219152 A1 | 10/2005 | Budd et al. | |
| 2012/0086623 A1* | 4/2012 | Takagi | G02B 6/0053 345/7 |
| 2012/0200935 A1* | 8/2012 | Miyao | G02B 27/0172 359/630 |
| 2012/0200937 A1* | 8/2012 | Totani | G02B 27/0172 359/631 |
| 2013/0033756 A1 | 2/2013 | Spitzer et al. | |
| 2013/0141527 A1* | 6/2013 | Shimizu | G02B 5/32 348/40 |

* cited by examiner

*Primary Examiner* — Ricky Mack
*Assistant Examiner* — Daniele Manikeu
(74) *Attorney, Agent, or Firm* — Oliff PLC

(57) ABSTRACT

In an optical system having an extremely simple configuration configured by first and second prisms which are prisms in a flat shape and a reflecting surface provided in these prisms, in the first prism which is disposed on a side close to the eyes, that is, on a side apart from a video display element (video element) at a certain distance, a correction lens surface for correcting a chromatic aberration of video light is provided. Accordingly, a virtual image display apparatus is small and light, and has a high performance with a reduced chromatic aberration of magnification.

11 Claims, 11 Drawing Sheets

VIRTUAL IMAGE DISPLAY APPARATUS

BACKGROUND

1. Technical Field

The present invention relates to a virtual image display apparatus which presents a video formed by an image display element or the like to an observer, and particularly relates to a virtual image display apparatus which is appropriate to a head-mounted display which is mounted on the head of the observer.

2. Related Art

Various technologies have been suggested as an optical system which is embedded in a virtual image display apparatus, such as a head-mounted display (hereinafter, referred to as an HMD), which is mounted on the head of an observer (refer to US Patent Publication No. 2013/0033756, US Patent Publication No. 2005/0219152, and U.S. Pat. No. 5,886,822).

It is desirable that the virtual image display apparatus, such as the HMD, reduce an apparatus weight for improving mounting comfort. Since it is advantageous to bend an optical path by using a reflecting surface in order to make the optical system small and reduce the weight, various optical systems which use a prism have been developed.

For example, in US Patent Publication No. 2013/0033756, an optical system, which is configured to have a prism in a flat board shape or in a prismatic column shape and one reflecting surface, is illustrated. The optical system has an extremely simple configuration and is advantageous in reducing the weight. However, for example, when a chromatic aberration of magnification remains and an image having a wide angle of view or a high resolution is formed, there is a case where an optical performance is not sufficient.

In US Patent Publication No. 2005/0219152, an optical system, which is configured to have a prism in a flat board shape or in a prismatic column shape and a plurality of lenses, is illustrated. However, the exemplified optical system has a complicated configuration with a great number of lenses. In addition, a light flux (luminous flux) emitted from a video element is inclined with respect to a normal line of a panel, and there is a possibility that a nonuniformity of the video or a deterioration of efficiency occurs.

In U.S. Pat. No. 5,886,822, an optical system, which is configured to have a prism in a flat board shape or in a prismatic column shape and a plurality of lenses, is illustrated. In the optical system, when a lens is disposed between the prism and the observer, and makes it possible to observe the external light, the lens has an influence on a see-through manner. By disposing a concave lens on an object side of the prism, it is possible to make visibility close to zero. However, in this case, since a magnification differs from that in a state of naked eyes, there is a possibility that an uncomfortable feeling is generated when the observer is a person who usually does not wear glasses, and quality of the see-through manner deteriorates.

SUMMARY

An advantage of some aspects of the invention is to provide a virtual image display apparatus which reduces a chromatic aberration of magnification or the like, has a high performance, and reduces a size and a weight of the apparatus.

An aspect of the invention is directed to a virtual image display apparatus including: a video element which generates video light; a splitter portion which transmits and reflects a part of the video light from the video element; and a light guiding member which has a light collecting mirror portion that collects the video light via the splitter portion and folds back the light to the splitter portion, and emits the video light via the splitter portion and the light collecting mirror portion to an observer side. The light guiding member has at least one correction lens surface which corrects the chromatic aberration of magnification of the passed video light.

In the virtual image display apparatus, as the splitter portion and the light collecting mirror portion are provided inside the light guiding member, it is possible to set a desired range of an optical path, to maintain the entire apparatus to be small and light, and to provide a relatively simple structure. Here, as the light guiding member is provided with at least one correction lens surface, even when the display apparatus has a simple structure, it is possible to reduce the chromatic aberration of magnification of the video light and to form an image having a high performance.

In a specific aspect of the invention, in the light guiding member, the correction lens surface is a spherical surface or an aspherical surface. In this case, it is possible to sufficiently reduce the chromatic aberration of magnification or the like of the video light by the spherical or the aspherical correction lens surface. In particular, when the correction lens surface is a spherical surface, it is possible to relatively easily manufacture the light guiding member. When the correction lens surface is an aspherical surface, it is possible to further reduce an aberration.

In another aspect of the invention, the light guiding member is a prism type member having an optical transparency which bonds the splitter portion and the light collecting mirror portion to each other to be integrated. In this case, a control of the light in the splitter portion or the light collecting mirror portion is stabilized. In addition, since the light guiding member is integrally formed, it is easy to handle the light guiding member.

In still another aspect of the invention, the light guiding member directly guides the video light which is incident from a light incident surface, without reflecting the video light on the inside on the optical path until the video light reaches the light collecting mirror portion via the splitter portion from the light incident surface. In this case, it is possible to provide a simple structure of the light guiding member, and to reduce a generation of aberration or the like in association with the reflection on the inside.

In yet another aspect of the invention, in the light guiding member, the correction lens surface and a light reflecting surface of the light collecting mirror portion are surfaces which are symmetrical with respect to an optical axis. In this case, for example, it is possible to reduce a generation of astigmatism or the like of an image, caused by the light-guiding, and to display high image quality.

In still yet another aspect of the invention, the virtual image display apparatus further includes an intermediate light guiding member which is disposed between the video element and the light guiding member, causes the video light from the video element to be incident, guides the video light on the inside, and emits the video light toward the light guiding member. In this case, as the intermediate light guiding member exists on a stage prior to the light guiding member having the correction lens surface, for example, in the light guiding member, even when the light incident surface is the correction lens surface, it is possible to achieve a sufficient effect of aberration correction on the correction lens surface by ensuring a certain distance from the video element on the optical path.

In further another aspect of the invention, the light guiding member allows the video light and external, light to be viewed in an overlapped manner. In this case, the observer can observe the external light in a see-through manner. At this time, for example, as the light guiding member is a prism in a rectangular parallelepiped shape, and in particular, as a surface which constitutes a part in front of the eyes is a horizontal plane, it is possible to prevent a defocusing or a distortion of the external light from being generated.

In still further another aspect of the invention, in the light guiding member, the splitter portion is disposed at the part in front of the eyes, the light collecting mirror portion is disposed to nip the splitter portion between the video element and the light collecting mirror portion, the splitter portion transmits at least a part of the video light from the video element and guides the light to the light collecting mirror portion, the light collecting mirror portion folds back the incident video light to the splitter portion, and the splitter portion reflects at least a part of the video light from the light collecting mirror portion, emits the light toward the eyes of the observer, transmits the external light, and allows the observer to view the video light and the external light. In this case, by transmitting and reflecting the video light in the splitter portion and by reflecting (folding back) the video light in the light collecting mirror portion, the video light is guided, and the external light is transmitted in the splitter portion. Accordingly, it is possible to allow the observer to view the video light and the external light in a overlapped manner.

In yet further another aspect of the invention, the light guiding member has the correction lens surface as a light emitting surface which emits the video light to the observer side. In this case, it is possible to form the correction lens surface at a position apart from the video element on the optical path.

In still yet further another aspect of the invention, the virtual image display apparatus further provides a visibility compensation element which is disposed facing a side far from the eyes of the observer with respect to the correction lens surface that functions as the light emitting surface of the light guiding member, and has an aspherical surface that offsets the visibility on the correction lens surface with respect to the external light. In this case, by the visibility compensation element, it is possible to offset the visibility, that is, to compensate for the distortion of the external light, caused by the correction lens surface. In a case of the see-through manner, it is possible to excellently maintain a state of an external image.

In a further aspect of the invention, the splitter portion is a polarization separation element. In this case, it is possible to extract the video light with high efficiency.

In a still further aspect the invention, the entire optical system, including the light guiding member, covers a part of the front of the eyes of the observer when the apparatus is mounted, and there may exist a part in which the front of the eyes is not covered. In this case, for example, even when the part of the light guiding member is not configured in a see-through manner, the observer can observe the environment from the vicinity of the light guiding member.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, with reference to FIG. 1 or the like, a virtual image display apparatus according to a first embodiment of the invention will be described in detail.

Figure 1:
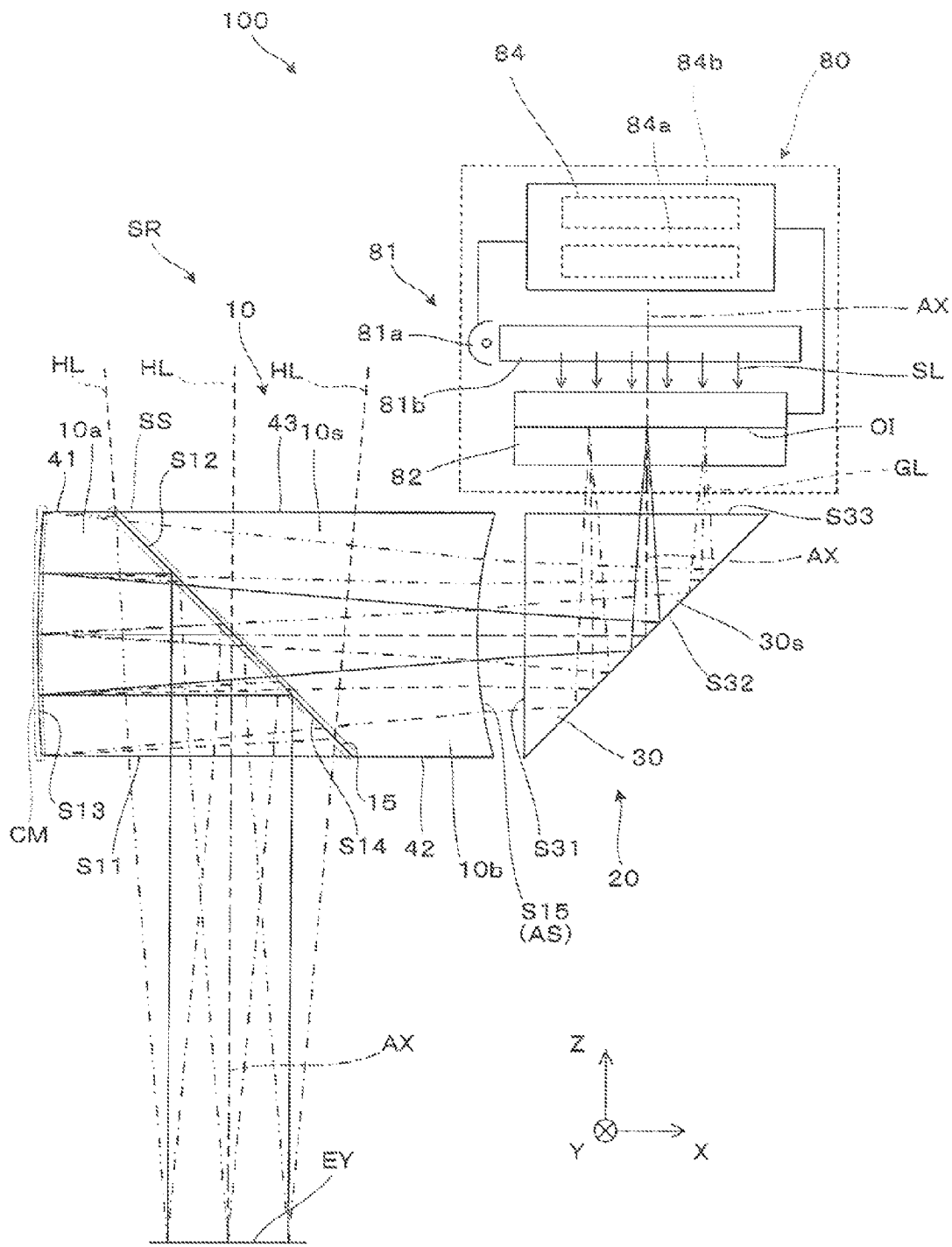
FIG. 1 is a cross-sectional view in a planar view of a main body part of a first display device which constitutes the virtual image display apparatus according to a first embodiment.

A virtual image display apparatus 100 of the embodiment illustrated in FIG. 1 is employed in a head-mounted display (HMD), and includes an image display device 80 and a light guiding device 20 as one group.

Figure 2:
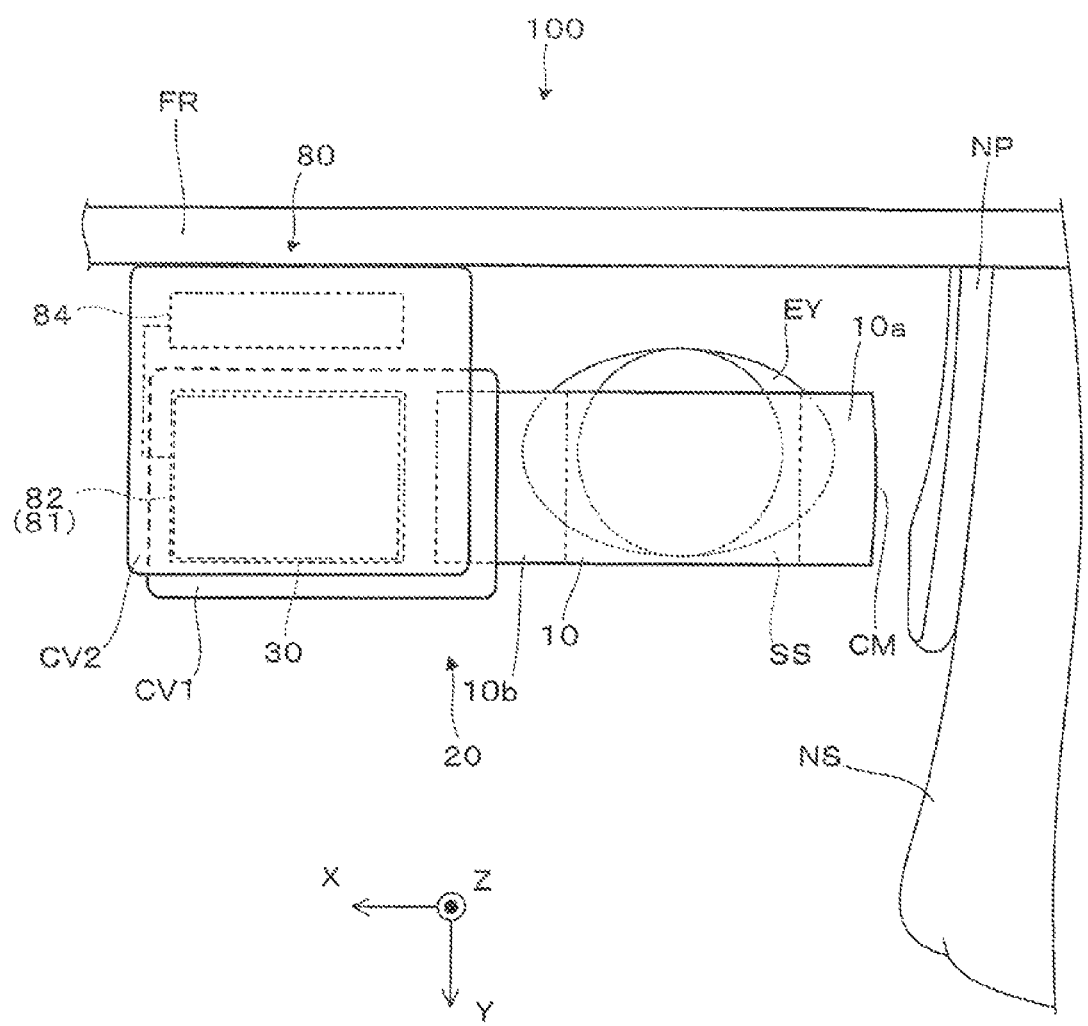
FIG. 2 is a schematic front view illustrating a state where the virtual image display apparatus is mounted.

The virtual image display apparatus 100 makes an observer recognize an image by forming a virtual image by image light, and makes the observer observe the environment in a see-through manner. The image display device 80 and the light guiding device 20 are usually provided on one side of any of the right and the left eyes of the observer. However, a case where the apparatus is for the right eye is illustrated here, and the drawings and description of the virtual image display apparatus for the left eye will be omitted because the virtual image display apparatus for the left eye is merely a horizontally reversed version of the virtual image display apparatus for the right eye. In addition, as illustrated in FIG. 2, the entire virtual image display apparatus 100 has an external appearance in which a small-sized apparatus is installed in a frame of general glasses.

Hereinafter, with reference to FIG. 1, functions, operations, or the like related to the image display device 80 and the light guiding device 20 will be described in detail. In addition, FIG. 1 illustrates a cross section of a reference surface SR including an optical axis AX of an optical system in the virtual image display apparatus 100.

The image display device 80 includes: a lighting device 81 which emits illumination light; a video display element 82 which is a transmission type spatial light modulation device; and a driving control portion 84 which controls the operation of the lighting device 81 and the video display element 82.

The lighting device 81 of the image display device 80 includes: a light source 81a which generates three colors, such as red, green, and blue; and a backlight light guiding portion 81b which disperses light from the light source and makes the light into a light flux of a rectangular cross section. The video display element (video element) 82 forms the image light which is formed, for example, by a liquid crystal display device, which is configured by a plurality of pixels, and which is supposed to be a display target of a moving image or the like by spatially modulating the illumination light from the lighting device 81. The driving control portion 84 is provided with a light source driving circuit 84a and a liquid crystal driving circuit 84b. The light source driving circuit 84a supplies electric power to the lighting device 81 and emits the illumination light having a stabilized luminance. The liquid crystal driving circuit 84b forms the video light or the image light having colors which are bases of the moving image or a still image as a transmittance pattern, by outputting an image signal or a driving signal with respect to the video display element (video element) 82. In addition, it is possible to give an image processing function to the liquid crystal driving circuit 84b, but it is also possible to give the image processing function to an external control circuit.

The light guiding device 20 is a prism type member which emits the video light emitted from the image display device 80 toward the eyes EY of the observer, and is provided with a first prism 10 which is a first light guiding member and a second prism 30 which is a second light guiding member.

In addition, in the first prism 10 and the second prism 30, main bodies 10s and 30s of each of the prisms 10 and 30 are respectively formed of a resin material which shows a high optical transparency in a visible area. For example, the main bodies 10s and 30s are formed by injecting a thermoplastic resin into a mold and hardening the thermoplastic resin. In addition, as a material of the main bodies 10s and 30s, it is possible to use a cycloolefin polymer or the like.

The first prism 10 is a prism type member in a rectangular parallelepiped shape having a curved surface at a part thereof, and is the first light guiding member which is disposed on a center side relatively close to the nose, among the light guiding members that constitute the light guiding device 20. The first prism 10 includes a first block part 10a, a second block part 10b, and a half mirror layer 15. By bonding these to be integrated, the first prism 10 is made to be in one rectangular parallelepiped shape.

Each part that constitutes the first prism 10 will be described in more detail. First, the first block part 10a is a columnar member having a curved surface at a part thereof, is disposed on a center side close to the nose, that is, on a light emitting side, and includes a first surface S11, a second surface S12, and a third surface S13 as side surfaces having an optical performance. In addition, the first block part 10a includes a side surface 41 which is a plane, as a side surface which does not contribute to guiding the video light. Next, the second block part 10b is a columnar member having a curved surface at a part thereof, is disposed on a peripheral side apart from the nose, that is, on a light incidence side, and includes a fourth surface S14 and a fifth surface S15 as side surfaces having an optical performance. In addition, the second block part 10b includes side surfaces 42 and 43 which are planes, as side surfaces which do not contribute to guiding the video light. Finally, the half mirror layer 15 is a reflecting film (that is, a semi-transmissive reflecting film) having an optical transparency, is disposed at a position which is in front of the eyes with respect to the eyes EY of the observer when the apparatus is mounted, and is a splitter which transmits and reflects a part of the video light or the external light. Among the surfaces of the first block part 10a and the second block part 10b, the second surface S12 and the fourth surface S14 are surfaces which are disposed facing each other and attached to each other. On these surfaces, the first block part 10a and the second block part 10b cooperate with each other and pinch the half mirror layer 15. A bonding part having the pinched half mirror layer 15 functions as a splitter portion SS which transmits or reflects a part of the video light or the external light that passes through the inside of the first prism 10. In addition, reflectivity and transmittance with respect to the video light of the half mirror layer 15 can be set appropriately, but, for example, the reflectivity may be 50% and the transmittance may be 50%. In other words, when the light passes through one time, half of components of the video light are transmitted, and half of the remaining components may be reflected.

In the first prism 10, among the surfaces of the first block part 10a, the first surface S11 is a plane which is disposed at a position right in front of the eyes EY when the apparatus is mounted, and is a light emission surface which emits the video light toward the eyes EY of the observer. The second surface S12 is a plane which makes an angle of 45° with respect to the first surface S11. The third surface S13 has a curved surface shape which is symmetrical with respect to an axis, and has a lens function. For example, in the first prism 10, as a mirror film which is formed by aluminum evaporation or the like on a surface of a part that corresponds to the third surface S13 is implemented, a light collecting mirror portion CM is formed. The third surface S13 functions as a light reflecting surface which reflects the video light by the light collecting mirror portion CM.

In first prism 10, among the surfaces of the second block part 10b, the fourth surface S14 is an even inclined surface which corresponds to the second surface S12, and as described above, is a surface which cooperates with the second surface S12 and pinches the half mirror layer 15. The fifth surface S15 is a light incident surface which causes the video light from the second prism 30 to be incident. Here, the fifth surface S15 is a spherical surface or an aspherical surface which is symmetrical with respect to an axis (for example, the spherical surface in the example illustrated in FIG. 1), functions as a correction lens surface AS having a function as a lens which corrects the video light, and corrects various types of aberrations, in particular, the chromatic aberration of magnification.

In addition, as described above, the first prism 10 has the side surface 41 or the side surfaces 42 and 43 as other surfaces which do not have an optical performance, in addition to each surface described above. For example, the side surface 41 is a plane which connects the second surface S12 and the third surface S13 of the first block part 10a. The side surfaces 42 and 43 are planes which connect the fourth surface S14 and the fifth surface S15 of the second block part 10b. The side surface 41 is a plane parallel to the first surface S11. The side surface 42 and the side surface 43 are planes which extend the first surface S11 and the side surface 41, respectively. In this manner, as each surface is connected to the others, the external appearance of the first prism 10 is in a rectangular parallelepiped shape.

As described above, the first prism 10 bonds each part, which includes the splitter portion SS or the light collecting mirror portion CM, to be integrated. In addition, an outer shape of the first prism 10 is defined by each surface and the first prism 10 is formed as one prism type member having an optical transparency. In addition, in the above-described case, when the apparatus is mounted, while the splitter portion SS is disposed at a part in front of the eyes, the light collecting mirror portion CM is relatively disposed on a nose (not illustrated) side of the observer. In other words, the light collecting mirror portion CM is disposed to nip the splitter portion SS between the video display element 82 and the light collecting mirror portion CM.

The second prism 30 is a prism type member in a triangular pillar shape. Among the light guiding members that constitute the light guiding device 20, the second prism 30 is a second light guiding member which is disposed on a peripheral side relatively far from the nose, and which is disposed between the video display element (video element) 82 and the first prism (first light guiding member) 10. The second prism 30 causes the video light from the video display element 82 to be incident, guides the video light on the inside, and emits the video light toward the first prism 10. In other words, the second prism 30 is an intermediate light guiding member which forms an optical path that connects the video display element 82 and the first prism 10 when guiding the video light. In addition, the second prism 30 includes: a first surface S31 which is a light emitting surface; a second surface S32 which is a reflecting surface that reflects the video light on the inside; and a third surface S33 which is a light incident surface. In the second prism 30, any of the first to the third surfaces S31 to S33 is also a plane, and is a surface which does not have a function as a lens. The first surface S31 is a surface which is parallel to a YZ surface, and the third surface S33 is a surface which is parallel to an XY surface. In other words, the first surface S31 and the third surface S33 are surfaces which are orthogonal to each other. In addition, the second surface S32 is parallel to a Y direction, and is a surface which is inclined by 45° with respect to both the first surface S31 and the third surface S33. In addition, as the mirror film which is formed by aluminum evaporation or the like on the surface of a part that corresponds to the second surface S32 is implemented, the second surface S32 functions as the light reflecting surface which reflects the video light.

Hereinafter, the optical path of video light GL will be described in accordance with the order of the optical path. First, as described above, the video light GL which is formed from video light SL by the image display device 30 relatively disposed on an ear (not illustrated) side of the observer and emitted, is incident from the third surface S33 of the second prism 30 along the optical axis AX, is bent to be reflected on the second surface S32 inclined by 45° with respect to the third surface S33, and is emitted toward the first prism 10 from the first surface S31. The video light GL emitted from the first surface S31 of the second prism 30 is incident from the fifth surface S15 which is the light incident surface and the correction lens surface AS among the surfaces of the second block part 10b of the first prism 10, is guided inside the second block part 10b, and is incident on the half mirror layer 15 that constitutes the splitter portion SS from the fourth surface S14. A part of a component of the video light GL passes through the half mirror layer 15, and is incident on the first block part 10a from the second surface S12. The video light GL which is incident on the first block part 10a is guided inside the first block part 10a, is reflected on the third surface S13, and moves toward the second surface S12 again. A part of the component of the video light GL emitted from the second surface S12 is reflected on the half mirror layer 15 and bent, is incident on the first block part 10a from the second surface S12 again, moves toward the first surface S11 of the first block part 10a, and is emitted toward the eyes EY of the observer from the first surface S11. The video light GL passing through the first surface S11 is incident on the pupil of the eyes EY of the observer or an equivalent position, as a substantially parallel light flux. In other words, by the video light GL as a virtual image, the observer observes the image formed on the video display element (video element) 82.

Each surface on the optical path along the optical axis AX described above is a surface which is symmetrical with respect to the optical axis AX. More specifically, among the surfaces which transmit or reflect the video light GL on the optical path along the optical axis AX, the correction lens surface AS and the third surface S13 (light reflecting surface of the light collecting mirror portion CM) which are curved surfaces having a refracting power respectively are surfaces which are symmetrical with respect to the optical axis AX. In this case, when the video light GL is guided, it is possible to reduce the generation of astigmatism of the image, and further, it is possible to display the formed image having high image quality.

In addition, when the video light GL is guided, the first prism 10 directly guides the video light GL inside the first prism 10 without reflecting the video light GL, on the optical path from the fifth surface S15 which is the light incident surface until the video light GL reaches the light collecting mirror portion CM via the splitter portion SS. Furthermore, the first prism 10 reflects the video light by the light collecting mirror portion CM, and further reflects the video light by the splitter portion SS and emits the video light toward the eyes EY of the observer from the first surface S1 which is the light emitting surface. Even at this time, except for the reflection of the light collecting mirror portion CM, the video light GL is directly guided without being reflected. As the structure which traces the optical path is simple in this manner, it is possible to reduce the generation of the aberration in accordance with the internal reflection. In addition, at this time, it is possible to reduce the size of the first prism 10, and further, to reduce the size of the entire virtual image display apparatus 100. In this case, for example, as illustrated in FIG. 2, it is possible to reduce a burden in weight applied to the observer when the apparatus is mounted.

However, even in the above-described simple structure, for example, there is a case where the aberration which is called the chromatic aberration of magnification is substantially generated. In particular, in a case of a structure in which the light guiding is performed by the prism of the simple structure which does not have a complicated curved surface like the above-described optical system, as a surface having a lens function, that is, a power, is limited, there is a possibility that the chromatic aberration of magnification or the like cannot be reduced sufficiently. In contrast, in the embodiment, as the fifth surface S15 is given a curvature and functions as the correction lens surface AS, the related problem is solved. In particular, in the embodiment, there is provided the second prism 30 which corresponds to the intermediate light guiding member which is a secondary light guiding member between the first prism 10 that is a main light guiding member and has the correction lens surface AS, and the image display device 80 which forms and emits the video light GL. Accordingly, as the distance on the optical path from the image display device 80 to the correction lens surface AS is ensured to some extent or more, it is possible to sufficiently provide a function as a lens for aberration correction by the correction lens surface AS.

In addition, in the description above, as the third surface S13 is a curved surface having a refracting power, an image by the video light GL is viewed as an image which is enlarged compared to a state where the video light is emitted from the video display element 82.

In addition, in the light guiding device 20, the first prism 10 which is the first light guiding member can guide and emit the video light GL, and external light HL can be seen. Specifically, as described above, by the first block part 10a and the second block part 10b, the first prism 10 is in a rectangular parallelepiped shape, and in particular, surfaces which constitute a part in front of the eyes are planes parallel to each other. Accordingly, when the external light HL is seen through the first prism 10 from the eyes EY of the observer (for example, when the external light HL is seen by passing through the first surface S11 and the side surface 42), the visibility is zero.

In addition, as an example is schematically illustrated in FIG. 2, in the light guiding device 20, a state where the apparatus is mounted becomes a state where a part of the first prism 10 and the entire second prism 30 are covered with a first protecting member CV1, each part of the image display device 80 is covered with a second protecting member CV2 which is linked to the first protecting member CV1, and the second protecting member CV2 is supported by a frame portion FR. In addition, regarding the supporting and fixing of the frame portion FR or the like in mounting the apparatus, for example, as illustrated in the drawing, as the virtual image display apparatus 100 has a structure in which a nose reception portion NP which extends vertically downward with respect to the frame portion FR is provided, the apparatus may be supported by the nose NS of the observer. Furthermore, although not illustrated in the drawing, as a spring structure for applying an energizing force or a hook structure for hooking the apparatus to a part of a human body is provided in the frame portion FR, the apparatus may be installed and fixed to the head or the ear of a wearer. In addition, as illustrated in the drawing, as can be found from the position of the eyes EY or the nose NS of the observer, the virtual image display apparatus 100 may be disposed slightly further downward than the center of the eyes. In this case, by setting a sight angle in a relaxed state when the observer closes the eyes, it is possible to adjust to observe in a state where a direction (sight line) of an eye line of the observer with respect to the video is naturally a downward side to the observer.

When the structure is extremely simple by the optical system which is configured by the prism in a plane shape and the reflecting surface described as an example in the above-described embodiment, and an image having a wide angle of view or a high resolution which is advantageous in reducing the weight but is likely to remain the chromatic aberration of magnification or the like is formed, there is a case where a configuration which has a sufficient optical performance is not possible. In contrast, in the embodiment, in the first prism 10 which is disposed on a side close to the eyes, that is, a side apart from the video display element (video element) 82 to some extent, the correction lens surface AS for correcting the chromatic aberration of the video light is provided. Accordingly, the virtual image display apparatus 100 is small and light, and has a high performance with a reduced chromatic aberration of magnification, or the like.

In addition, in a case illustrated in FIG. 2, in the light guiding device 20, the first prism 10 disposed at a part in front of the eyes covers the front of the eyes EY, that is, a part of the front of the eyes of the observer when the apparatus is mounted, and has a part in which the front of the eyes is not covered. In this case, even if the first prism 10 is configured not to be in a see-through manner, the observer can observe the environment from the vicinity of the light guiding member.

EXAMPLES

Hereinafter, examples of the light guiding device including a first prism and a second prism embedded in the virtual image display apparatus according to the invention will be described. Symbols used in each example are as follows.
SPH: Spherical surface
ASP: Aspherical surface (aspherical surface which is symmetrical with respect to an axis)
R: Radius of curvature
T: Interval on an axial upper surface
Nd: Refractive index with respect to a d line of an optical material
Vd: Abbe number related to the d line of the optical material
TLY: Optical axis inclination angle (°) on a cross section (XZ cross section) of a certain surface (there is a case where the TLY changes at front and rear parts of a specified surface)

Example 1

Data of an optical surface which constitutes the light guiding device in a projection and penetration device of Example 1 is illustrated in Table 1 described below. In addition, two SPHs in the table respectively mean the third surface S13 which is the reflecting surface of the first prism 10 and the fifth surface S15 (refer to FIG. 3) which is the correction lens surface AS.

TABLE 1

| No | Type | R | T | Nd | Vd |
|---|---|---|---|---|---|
| 1 | Pupil | ∞ | 20.00 | | |
| 2 | Plane | ∞ | 5.00 | 1.525 | 55.95 |
| 3 | Plane | ∞ | −8.00 | 1.525 | 55.95 |
| 4 | SPH | 62.942 | 18.11 | 1.525 | 55.95 |
| 5 | SPH | 18.336 | 2.00 | | |
| 6 | Plane | ∞ | 5.00 | 1.517 | 64.17 |
| 7 | Plane | ∞ | −5.00 | 1.517 | 64.17 |
| 8 | Plane | ∞ | −2.00 | | |
| 9 | Plane | ∞ | −1.60 | 1.458 | 67.82 |
| 10 | Image surface | ∞ | | | |

Regarding the optical surface in the light guiding member which constitutes Example 1, the optical axis inclination angle (tilt) TLY in the cross section is illustrated in Table 2 described below.

TABLE 2

| No | Type | TLY (Front of face) | TLY (Rear of face) |
|---|---|---|---|
| 2 | Plane | 0.0 | 0.0 |
| 3 | Plane | 45.0 | 45.0 |
| 4 | SPH | 0.0 | 0.0 |
| 5 | SPH | 0.0 | 0.0 |
| 6 | Plane | 0.0 | 0.0 |
| 7 | Plane | 45.0 | 45.0 |
| 8 | Plane | 0.0 | 0.0 |
| 9 | Plane | 0.0 | 0.0 |

Figure 3:
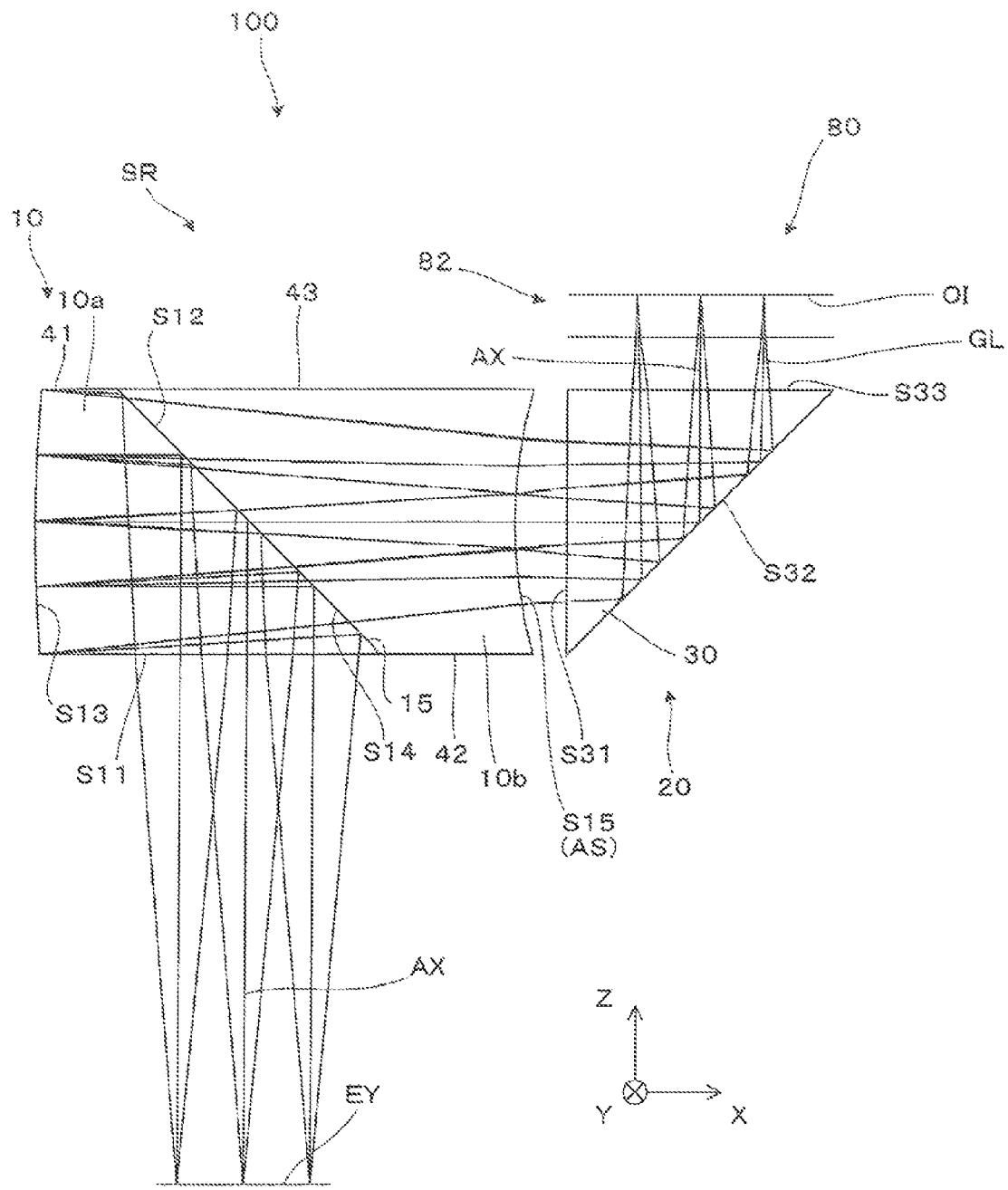
FIG. 3 is a view illustrating an optical system of Example 1.

FIG. 3 is a cross-sectional view of the virtual image display apparatus 100 of Example 1. In the light guiding device 20 of the virtual image display apparatus 100, the correction lens surface AS (fifth surface S15) of the first prism 10 is a spherical surface. In addition, other surfaces of the light guiding device 20 are planes, except for the third surface S13. In addition, each surface of the second prism 30 is also a plane. If specific specifications of the optical system of Example 1 are described, a horizontal angle of view is 10°, a vertical angle of view is 6°, a size of a display area of the video display element is 5.6 mm, a pupil diameter is Φ5 mm, and a focal length is approximately 27.5 mm.

Figure 4A:
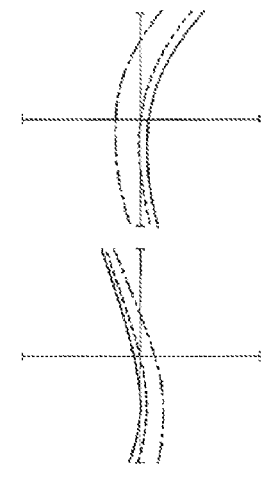
FIGS. 4A to 4I are views illustrating an aberration of a video element of the optical system of Example 1.
Figure 4B:
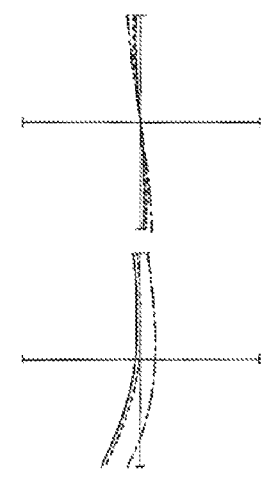
Figure 4C:
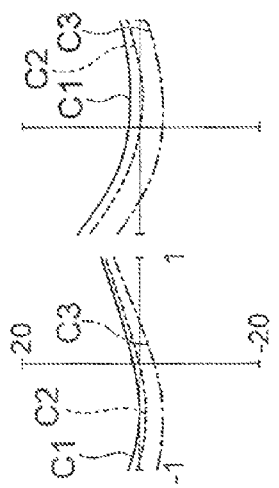
Figure 4D:
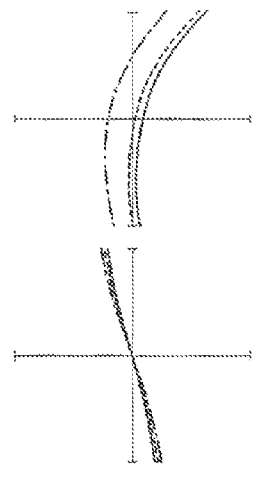
Figure 4E:
Figure 4F:
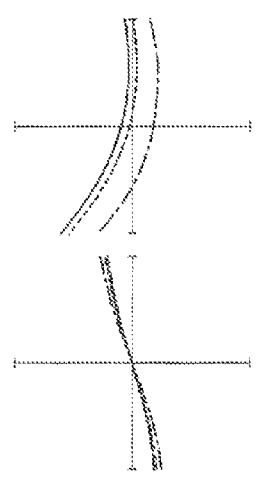
Figure 4G:
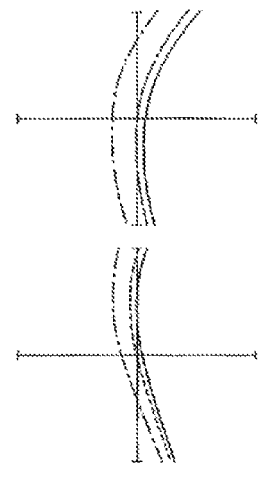
Figure 4H:
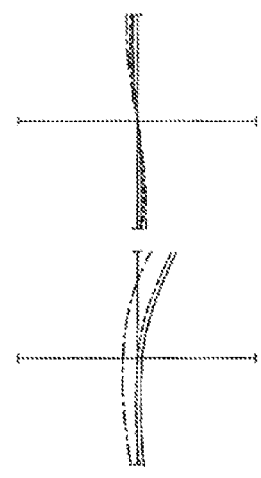
Figure 4I:
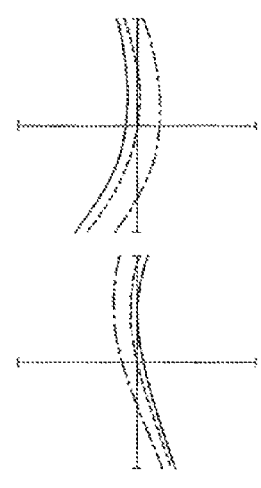

FIGS. 4A to 4I illustrate the aberration on a position of an image surface OI which is a reference position of the video display element 82 in the optical system of Example 1. In addition, in the description below, an X direction and a Y direction in each aberration drawing of FIGS. 4A to 4I are considered in a state where the optical path of FIG. 3 is developed in a Z direction. In other words, an extending direction of the optical axis when the optical path illustrated in FIG. 3 is developed is the Z direction, and the aberration illustrated in FIGS. 4A to 4I is obtained in the Y direction and in the X direction which are perpendicular to the Z direction. In a case of each aberration drawing illustrated in FIGS. 4A to 4I, the Y direction matches the Y direction illustrated in FIG. 3, but since the X direction is developed by folding back the optical path in FIG. 3, the X direction does not necessarily match the X direction in a case of FIG. 3. In addition, here, among the curved lines in the drawings, a curved line C1 illustrated as a solid line illustrates a value regarding a component of a wavelength band (R) of 656 nm, a curved line C2 illustrated as a dotted line illustrates a value regarding a component of a wavelength band (G) of 588 nm, and a curved line C3 illustrated as a one-dot chain line illustrates a value regarding a component of a wavelength band (EB) of 486 nm. In addition, an aberration amount illustrated in each drawing is an aberration amount on the image surface of the video display element in a case where a ray of light is made to move backward for convenience. In each aberration drawing, the horizontal axis illustrates a position in the pupil, and the vertical axis illustrates the aberration amount. The numerical value is in a unit of microns in both axes. In particular, FIG. 4A illustrates the aberration of the Y and the X directions when the X direction is at 5.0° and the Y direction is at 3.0° of orientation, FIG. 4B illustrates the aberration of the Y and the X directions when the X direction is at 0.0° and the Y direction is at 3.0° of orientation, and FIG. 4C illustrates the aberration of the Y and the X directions when the X direction is at −5.0° and the Y direction is at 3.0° of orientation. FIG. 4D illustrates the aberration of the Y and the X directions when the X direction is at 5.0° and the Y direction is at 0.0° of orientation, FIG. 4E illustrates the aberration of the Y and the X directions when the X direction is at 0.0° and the Y direction is at 0.0° of orientation, and FIG. 4F illustrates the aberration of the Y and the X directions when the X direction is at −5.0° and the Y direction is at 0.0° of orientation. FIG. 4G illustrates the aberration of the Y and the X directions when the X direction is at 5.0° and the Y direction is at −3.0° of orientation, FIG. 4H illustrates the aberration of the Y and the X directions when the X direction is at 0.0° and the Y direction is at −3.0° of orientation, and FIG. 4I illustrates the aberration of the Y and the X directions when the X direction is at −5.0° and the Y direction is at −3.0° of orientation.

Data of the optical surface which constitutes the light guiding device in the projection and penetration device of a comparative example is illustrated in Table 3 described below.

TABLE 3

| No | Type | R | T | Nd | Vd |
|---|---|---|---|---|---|
| 1 | Pupil | ∞ | 20.00 | | |
| 2 | Plane | ∞ | 5.00 | 1.525 | 55.95 |
| 3 | Plane | ∞ | −8.00 | 1.525 | 55.95 |
| 4 | SPH | 84.016 | 24.17 | 1.525 | 55.95 |
| 5 | Plane | ∞ | 2.00 | | |

TABLE 3-continued

| No | Type | R | T | Nd | Vd |
|---|---|---|---|---|---|
| 6 | Plane | ∞ | 5.00 | 1.517 | 64.17 |
| 7 | Plane | ∞ | −5.00 | 1.517 | 64.17 |
| 8 | Plane | ∞ | −2.00 | | |
| 9 | Plane | ∞ | −1.60 | 1.458 | 67.82 |
| 10 | Image surface | ∞ | | | |

Regarding the optical surface in the light guiding member which constitutes the comparative example, the optical axis inclination angle (tilt) TLY in the cross section is illustrated in Table 4 described below.

TABLE 4

| No | Type | TLY (Front of face) | TLY (Rear of face) |
|---|---|---|---|
| 2 | Plane | 0.0 | 0.0 |
| 3 | Plane | 45.0 | 45.0 |
| 4 | SPH | 0.0 | 0.0 |
| 5 | Plane | 0.0 | 0.0 |
| 6 | Plane | 0.0 | 0.0 |
| 7 | Plane | 45.0 | 45.0 |
| 8 | Plane | 0.0 | 0.0 |
| 9 | Plane | 0.0 | 0.0 |

Figure 5:
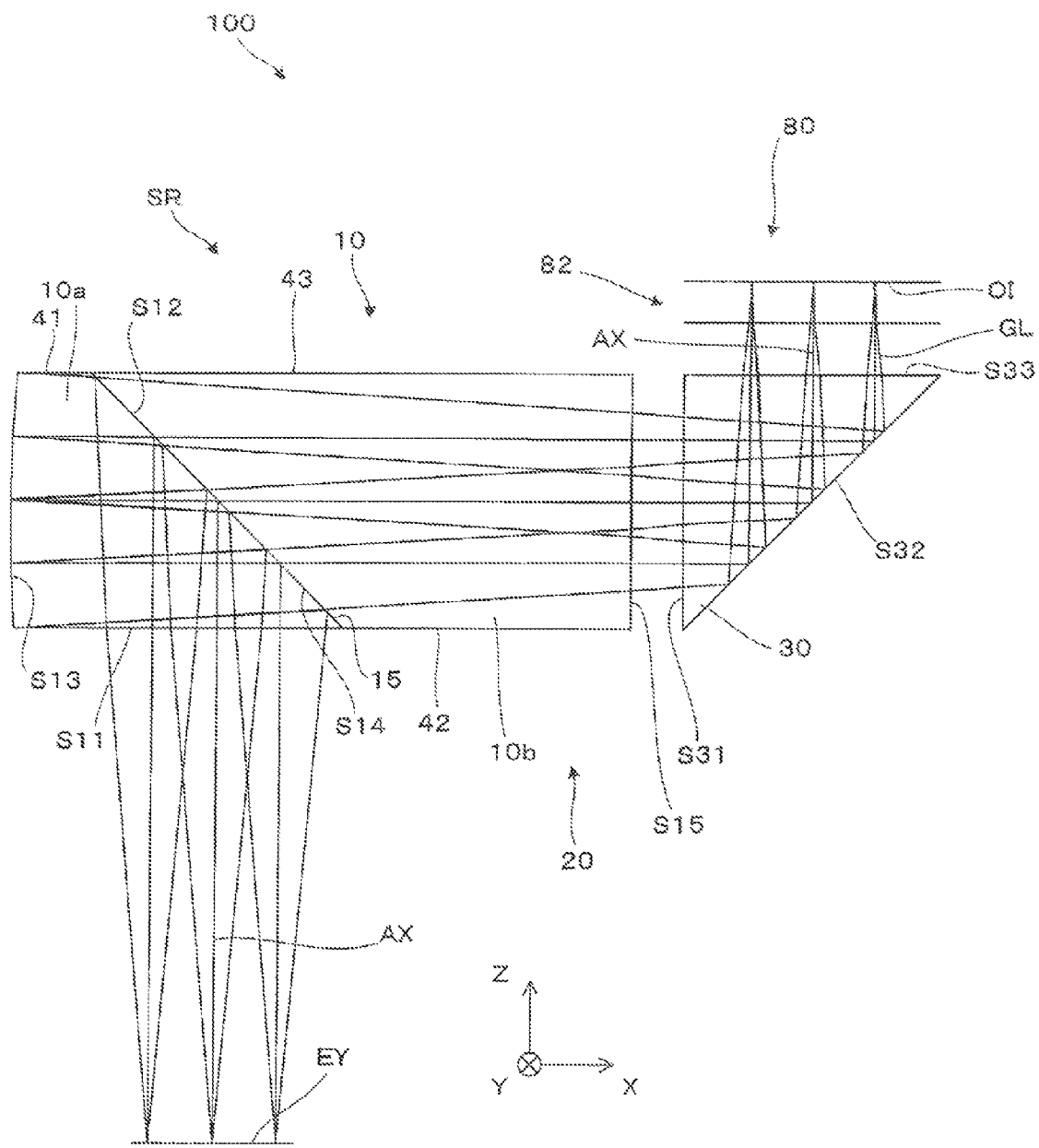
FIG. 5 is a view illustrating an optical system of a comparative example.
Figure 6C:
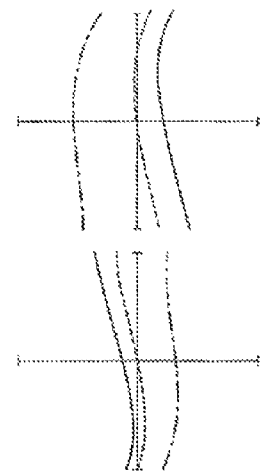
FIGS. 6A to 6I are views illustrating an aberration of a video element of the optical system of the comparative example.
Figure 6F:
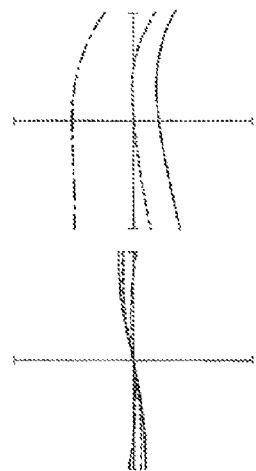
Figure 6I:
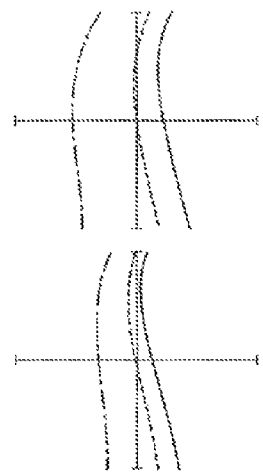
Figure 6B:
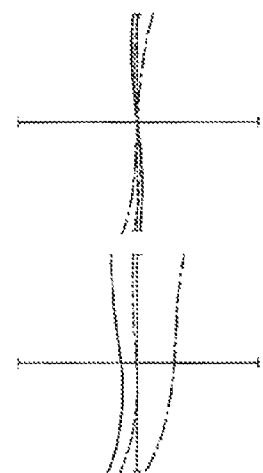
Figure 6E:
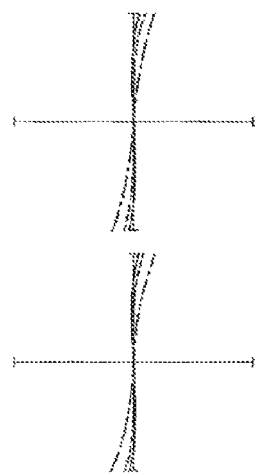
Figure 6H:
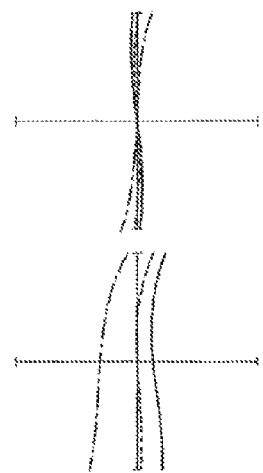
Figure 6A:
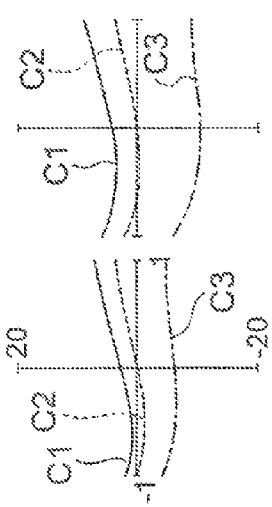
Figure 6D:
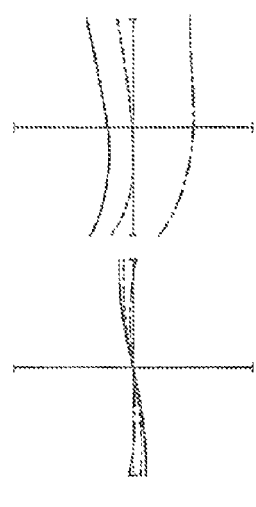
Figure 6G:
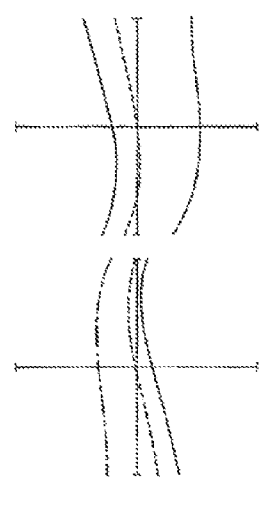

FIG. 5 and FIGS. 6A to 6I are views illustrating the virtual image display apparatus of the comparative example. FIG. 5 is a view of the comparative example which corresponds to FIG. 3, and FIGS. 6A to 6I are aberration views of the comparative example which corresponds to FIGS. 4A to 4I. As illustrated in FIG. 5, in the comparative example, a surface which corresponds to the correction lens surface AS illustrated in FIG. 3 does not exist. In other words, the fifth surface S15 is a plane which is neither a spherical surface nor an aspherical surface and which does not function as the correction lens. As will be apparent by comparing each of the aberrations illustrated in FIGS. 6A to 6I and the aberrations illustrated in FIGS. 4A to 4I, in addition to the case of Example 1, it is found that the chromatic aberration of magnification decreases. For example, when comparing the aberration drawing of the X direction of FIG. 4A and the aberration drawing of the X direction of FIG. 6A, at a position of a main ray of light, in the example, B-G is 4 µm, and is approximately 40 percent of 10.4 µm of the comparative example (related art). In other words, as the correction lens surface AS is provided like in the embodiment, the aberration, such as the chromatic aberration of magnification, is reduced in the structure.

Example 2

Data of the optical surface which constitutes the light guiding device in the projection and penetration device of Example 2 is illustrated in Table 5 described below. In addition, an SPH in the table means the third surface S13 which is the reflecting surface of the first prism 10, and an ASP means the fifth surface S15 (refer to FIG. 7) which is the correction lens surface AS, respectively.

TABLE 5

| No | Type | R | T | Nd | Vd |
|---|---|---|---|---|---|
| 1 | Pupil | ∞ | 20.00 | | |
| 2 | Plane | ∞ | 5.00 | 1.525 | 55.95 |
| 3 | Plane | ∞ | −8.00 | 1.525 | 55.95 |
| 4 | SPH | 57.775 | 16.60 | 1.525 | 55.95 |
| 5 | ASP | 13.661 | 2.00 | | |
| 6 | Plane | ∞ | 5.00 | 1.517 | 64.17 |
| 7 | Plane | ∞ | −5.00 | 1.517 | 64.17 |
| 8 | Plane | ∞ | −2.00 | | |
| 9 | Plane | ∞ | −1.60 | 1.458 | 67.82 |
| 10 | Image surface | ∞ | | | |

Regarding the optical surface in the light guiding member which constitutes Example 2, the optical axis inclination angle (tilt) TLY in the cross section is illustrated in Table 6 described below.

TABLE 6

| No | Type | TLY (Front of face) | TLY (Rear of face) |
|---|---|---|---|
| 2 | Plane | 0.0 | 0.0 |
| 3 | Plane | 45.0 | 45.0 |
| 4 | SPH | 0.0 | 0.0 |
| 5 | ASP | 0.0 | 0.0 |
| 6 | Plane | 0.0 | 0.0 |
| 7 | Plane | 45.0 | 45.0 |
| 8 | Plane | 0.0 | 0.0 |
| 9 | Plane | 0.0 | 0.0 |

A coefficient of the aspherical surface on the optical surface of Example 2 is illustrated in Table 7 described below.

TABLE 7

| | ASP |
|---|---|
| K | −1 |
| B4 | 7.312E−07 |
| B6 | 5.126E−08 |
| B8 | −8.765E−10 |

In Table 7 described above, the numerical value after E means an exponent part of decimal digit. For example "7.312E-07" means $7.312 \times 10^{07}$. In addition, symbols K and Bi illustrate a coefficient for specifying the correction lens surface AS (fifth surface S15) which is an aspherical surface. The aspherical surface is specified by a polynomial expression (aspherical surface expression) described below.

$$z = \frac{(1/R) \times h^2}{1 + \sqrt{1 - (K+1) \times (1/R)^2 \times h^2}} + B_4 h^4 + B_6 h^6 + B_8 h^8 + \ldots$$

Here, R is a radius of curvature of each surface, h is a height from the optical axis, K is a constant of the cone of a target lens surface, and Bi (i=4, 6, 8, . . . ) is a high order aspherical surface coefficient of the target lens surface.

Figure 7:
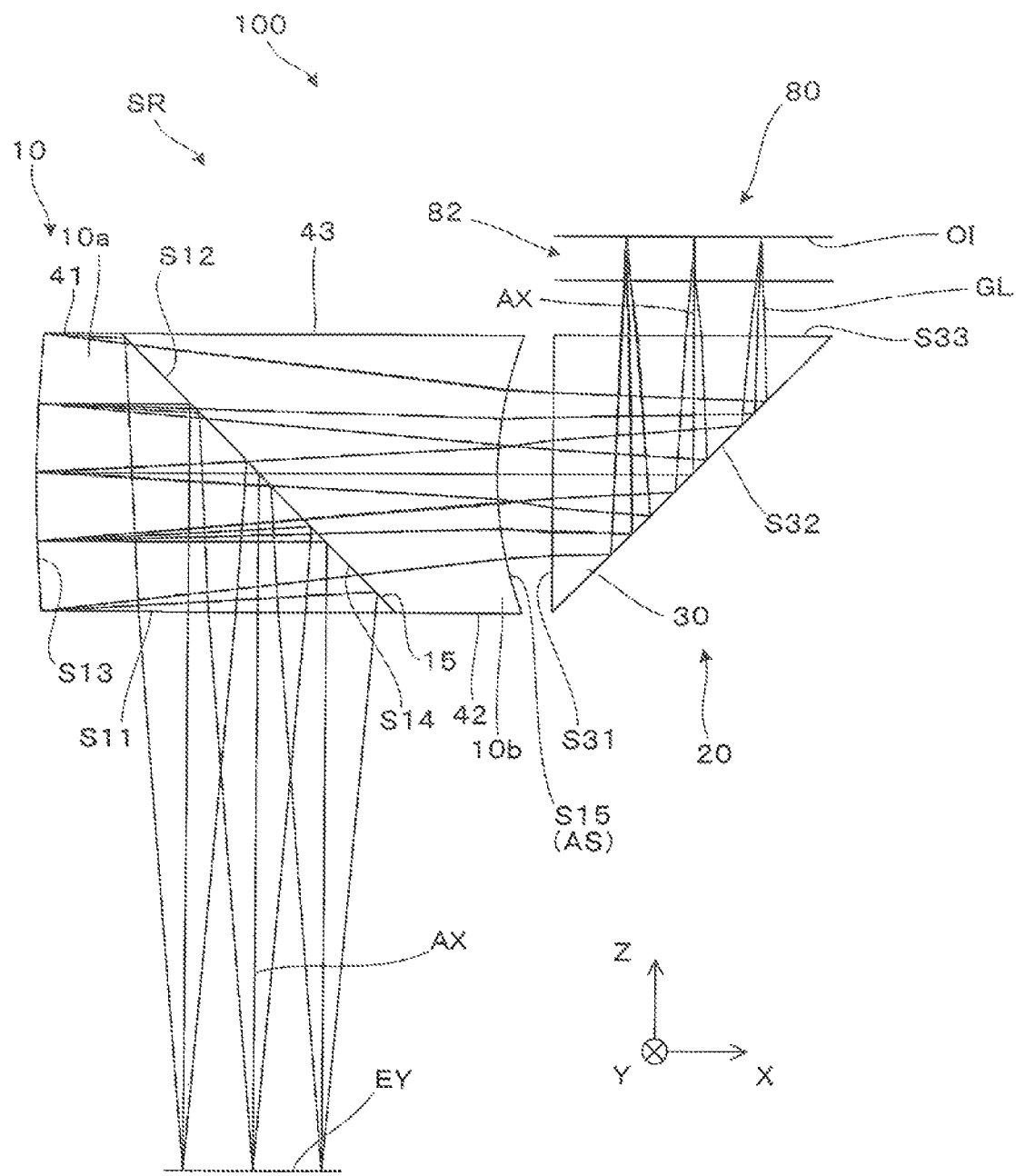
FIG. 7 is a view illustrating an optical system of Example 2.

FIG. 7 is a cross-sectional view of the virtual image display apparatus 100 of Example 2. In the light guiding device 20 of the virtual image display apparatus 100, the correction lens surface AS (fifth surface S15) of the first prism 10 is different from that of Example 1 in that the surface is an aspherical surface (aspherical surface which is symmetrical with respect to the axis). In addition, other surfaces of the light guiding device 20 are planes, except for the third surface S13. In addition, each surface of the second prism 30 is also a plane. If specific specifications of the optical system of Example 2 are described, a horizontal angle of view is 10°, a vertical angle of view is 6°, a size of a display area of the video display element is 5.6 mm, a pupil diameter is Φ5 mm, and a focal length is approximately 27.5 mm.

Figure 8A:
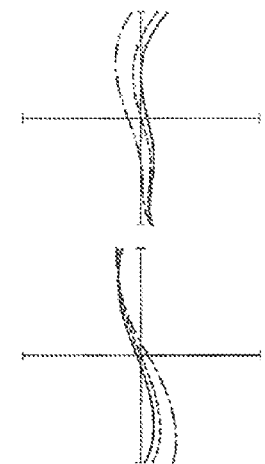
FIGS. 8A to 8I are views illustrating an aberration of a video element of the optical system of Example 2.
Figure 8B:
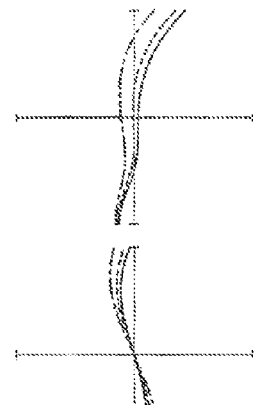
Figure 8C:
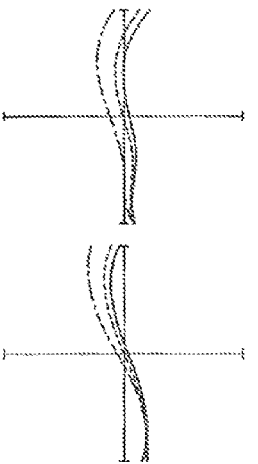
Figure 8D:
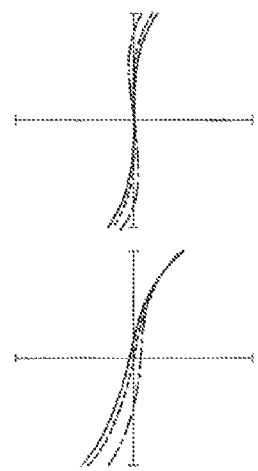
Figure 8E:
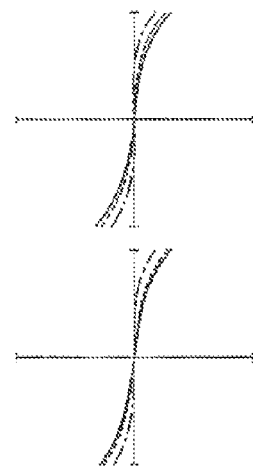
Figure 8F:
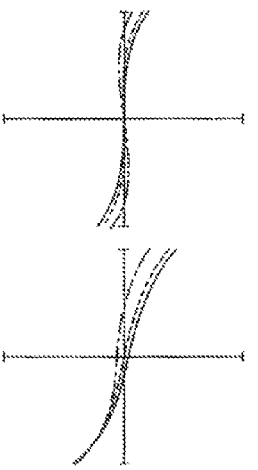
Figure 8G:
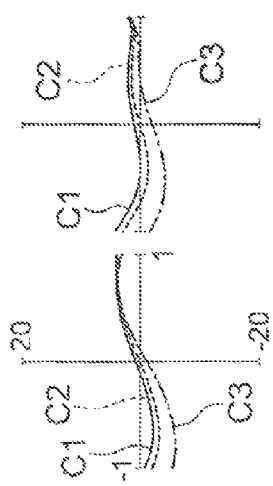
Figure 8H:
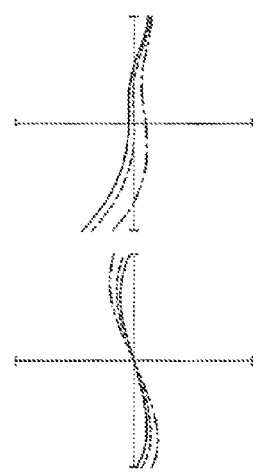
Figure 8I:
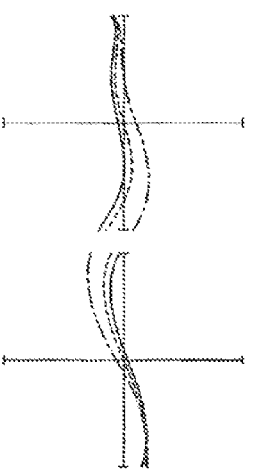

FIGS. 8A to 8I illustrate the aberration on the position of the image surface OI which is a reference position of the video display element 82 in the optical system of Example 2. Here, among the curved lines in the drawings, a curved line C1 illustrated as a solid line illustrates a value regarding a component of a wavelength band of 656 nm, a curved line C2 illustrated as a dotted line illustrates a value regarding a component of a wavelength band of 588 nm, and a curved line C3 illustrated as a one-dot chain line illustrates a value regarding a component of a wavelength band of 486 nm. In addition, an aberration amount illustrated in each drawing is an aberration amount on the image surface of the video display element in a case where a ray of light is made to move backward for convenience. In each aberration drawing, the horizontal axis illustrates a position in the pupil, and the vertical axis illustrates the aberration amount in a unit of microns. In particular, FIG. 8A illustrates the aberration of the Y and the X directions when the X direction is at 5.0° and the Y direction is at 3.0° of orientation, FIG. 8B illustrates the aberration of the Y and the X directions when the X direction is at 0.0° and the Y direction is at 3.0° of orientation, and FIG. 8C illustrates the aberration of the Y and the X directions when the X direction is at −5.0° and the Y direction is at 3.0° of orientation. FIG. 8D illustrates the aberration of the Y and the X directions when the X direction is at 5.0° and the Y direction is at 0.0° of orientation, FIG. 8E illustrates the aberration of the Y and the X directions when the X direction is at 0.0° and the Y direction is at 0.0° of orientation, and FIG. 8F illustrates the aberration of the Y and the X directions when the X direction is at −5.0° and the Y direction is at 0.0° of orientation. FIG. 8G illustrates the aberration of the Y and the X directions when the X direction is at 5.0° and the Y direction is at −3.0° of orientation, FIG. 8H illustrates the aberration of the Y and the X directions when the X direction is at 0.0° and the Y direction is at −3.0° of orientation, and FIG. 8I illustrates the aberration of the Y and the X directions when the X direction is at −5.0° and the Y direction is at −3.0° of orientation.

In a case of Example 2, as the correction lens surface AS is an aspherical surface, it is found that the aberration is further reduced. For example, when comparing the aberration drawing of the X direction of FIG. 8A and the aberration drawing of the X direction of FIG. 6A, at a position of the main ray of light, in the example, B-G is 2.2 μm, and is approximately 20 percent of 10.4 μm of the related art.

Second Embodiment

Figure 9:
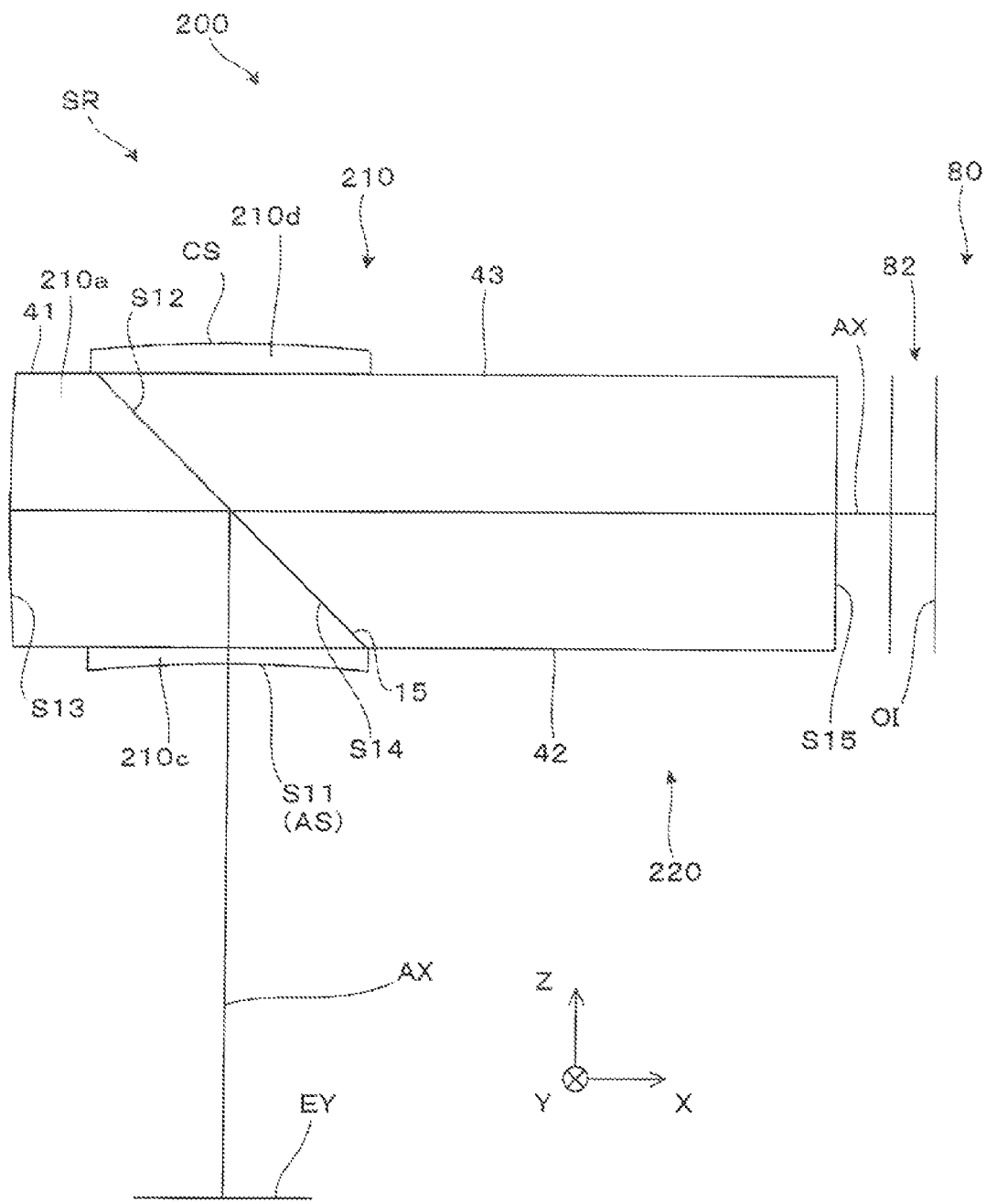
FIG. 9 is a view illustrating a virtual image display apparatus according to a second embodiment.

Hereinafter, with reference to FIG. 9, the virtual image display apparatus according to a second embodiment of the invention will be described in detail. In addition, since the virtual image display apparatus of the embodiment is a modification example of the virtual image display apparatus 100 of the first embodiment, and other characteristics than the structure of the light guiding member are similar, the description of the entire configuration or the like will be omitted.

In a virtual image display apparatus 200 of the embodiment, a light guiding device 220 is configured by a prism 210 which is one light guiding member. In other words, the configuration is different from that in a case of the first embodiment, and the intermediate light guiding member (second light guiding member) is not provided. Specifically, one prism 210 which constitutes the light guiding device 220 includes a first block part 210a, a second block part 210b, and the half mirror layer 15, which are prism parts for guiding the light, as a light guiding member which corresponds to the first prism 10 that is the first light guiding member in the first embodiment. By the first block part 210a and the second block part 210b, the half mirror layer 15 is nipped. Furthermore, the prism 210 includes: a third block part 210c which is disposed on the light emitting side; and a fourth block part 210d which is disposed facing the third block part 210c, in addition to the first block part 210a and the second block part 210b.

The third block part 210c is formed of the same material as the first block part 210a, is disposed on the light emitting side of the first block part 210a, that is, at a position in front of the eyes EY, and has the first surface S11 which is the light emitting surface as the correction lens surface AS. In other words, the light guiding device 220 reduces the aberration, such as the chromatic aberration of magnification, by the correction lens surface AS provided in the third block part 210c. In addition, in this case, the fifth surface S15 of the second block part 210b is the light incident surface which is disposed facing the video display element 82, and is in a planar shape which does not have a refractive force.

In a case of the embodiment, as the third block part 210c is positioned to be the farthest apart on the optical path from the video display element 32, even when the light guiding device 220 is configured by an independent light guiding member without the intermediate light guiding member, it is possible to perform a necessary aberration correction.

In addition, in the embodiment, there is provided the fourth block part 210d which is disposed facing the third block part 210c, that is, on a side opposite to the third block part 210c which nips the first block part 210a and the second block part 210b. The fourth block part 210d has a curved surface CS on a surface side, the radius of curvature of the curved surface CS corresponds to the curvature of the correction lens surface AS of the third block part 210c, and the visibility of the correction lens surface AS is offset. Accordingly, distortion or the like of the external light HL due to the see-through manner is reduced. In other words, the fourth block part 210d functions as a visibility compensation element which compensates for the distortion of the external light HL caused by the correction lens surface AS of the third block part 210c.

Other

The invention is described according to each of the above-described embodiments, but the invention is not limited to the above-described embodiments. Various embodiments are possible without departing from the scope of the invention. For example, a modification as follows is possible.

In the description above, the distribution of display luminance is not particularly adjusted in the video display element 82, but in a case where a luminance difference is generated according to the position, it is possible to unevenly adjust the distribution of the display luminance.

Figure 10:
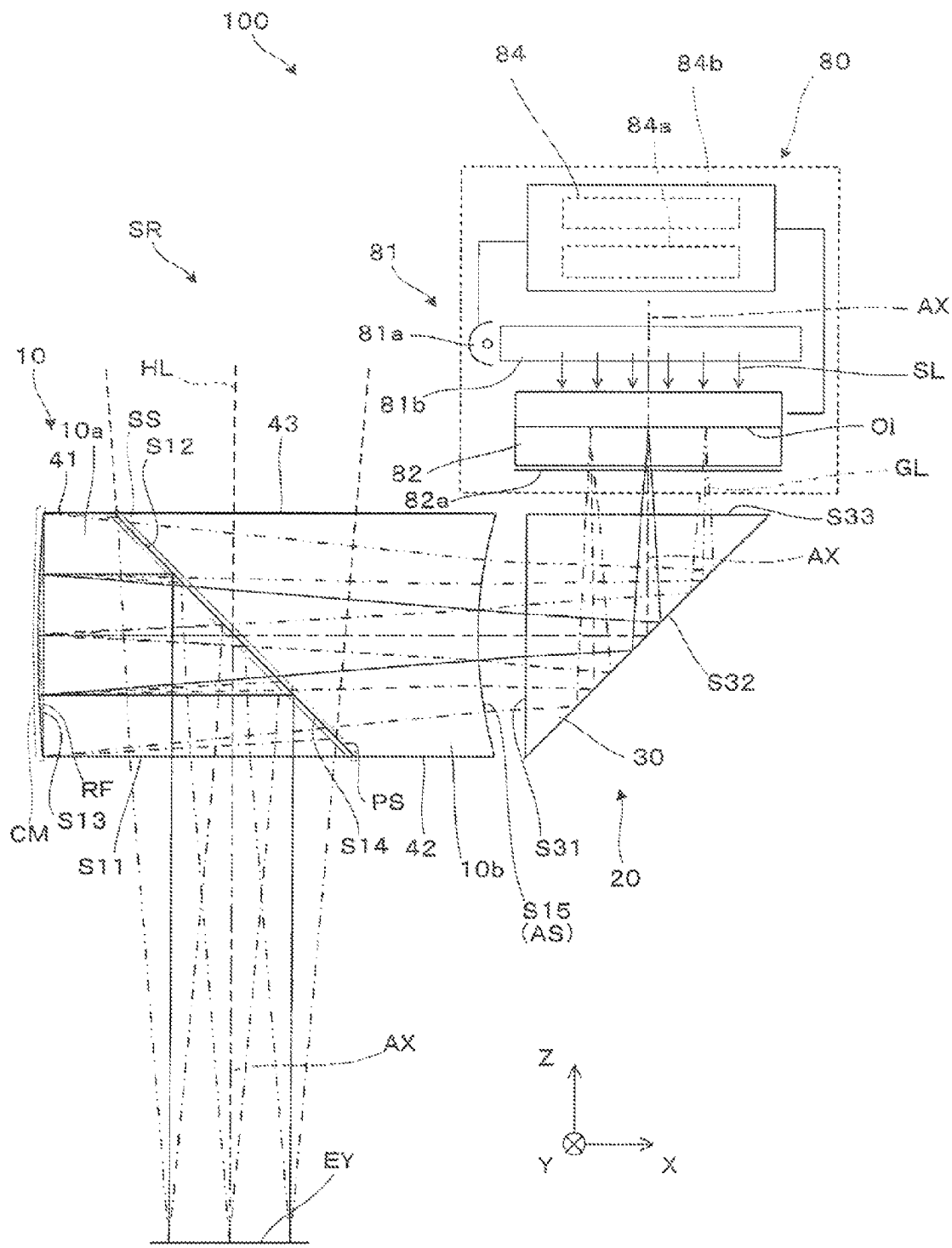
FIG. 10 is a view illustrating one modification example of the virtual image display apparatus.

In the description above, the splitter portion SS which transmits or reflects a part of the video light or the external light is configured by the half mirror layer 15, that is, the semi-transmissive reflecting film. However, not being limited thereto, it can also be considered that the splitter portion SS is configured by a polarization separation element. In particular, for example, as illustrated in FIG. 10, in the splitter portion SS, a polarization separation element PS is provided instead of the half mirror layer of FIG. 1, and a λ/4-wave retardation plate RF is provided on a rear part of the splitter portion SS, that is, between the splitter portion SS and the light collecting mirror portion CM. Furthermore, in the video display element 82, it is possible to provide a polarizing plate 82a which arranges a polarization state on the light emitting side. Here, the polarization separation element PS is a dielectric multilayer, and transmits a component of P-polarized light (polarized light which is polarized in a first direction), with respect to an incident surface of the polarization separation element PS, among the incident lights. Meanwhile, the polarization separation element PS reflects a component of S-polarized light (polarized light which is polarized in a second direction) which is a polarized light in a direction perpendicular to the P-polarized light. In addition, the video light GL emitted from the video display element 82 is converted into linearly polarized light which is polarized to be the P-polarized light when incident on the polarization separation element PS of the rear part, by the polarizing plate 82a. As the polarization state is adjusted as above, the video light GL which is incident on the polarization separation element PS via the second block part 10b is incident on the polarization separation element PS almost without generating a loss. In addition, as described above, in the first block part 10a, as the λ/4-wave retardation plate RF is provided between the splitter portion SS and the light collecting mirror portion CM, consequently, in the polarization separation element PS, the video light GL is reflected almost without generating a loss, and moves toward the first surface S11 which is the light emitting surface. As the configuration described above is employed, it is possible to extract the video light GL at high efficiency. In addition, in the description above, as the λ/4-wave retardation plate RF is provided, a configuration in which the light collecting mirror portion CM is configured by a separated concave mirror, may be employed. When describing specifically, for example, it is also possible to have a configuration in which an end surface on the third surface S13 side of the first block part 10a is a planar surface, the λ/4-wave retardation plate RE is provided on the end surface, and further, the λ/4-wave retardation plate RF is covered by the light collecting mirror portion CM configured by the separated concave mirror.

In addition, the correction lens surface AS having one surface is provided, but the correction lens surface AS may have two or more surfaces. For example, in the first embodiment, not being limited to the fifth surface S15 which is the light incident surface, the first surface S11 which is the light incident surface may function as the correction lens surface which is a spherical surface or an aspherical surface and which corrects the aberration, such as the chromatic aberration of magnification.

In the description above, the video display element 82 which is formed of a transmission type liquid crystal display device or the like is used as the image display device 80. However, as the image display device 80, it is possible to use various members without limiting to the video display element 82 which is formed of the transmission type liquid crystal display device or the like. For example, a configuration in which a reflection type liquid crystal display device is used is also possible. In this case, a polarization beam splitter (polarization separation element) is used as the prism 30 right in front of the video display element 82. When the light source is disposed at a position facing the video element, it is possible to have a compact configuration as an entire configuration. In addition, it is possible to use a digital micromirror device or the like instead of the video display element 82 which is formed of the liquid crystal display device or the like. In addition, it is possible to use a self-luminous type element which is represented by an LED array or an OLED (organic EL) as the image display device 80.

In addition, in the description above, the image display device 80 is disposed on a +Z side with respect to the light guiding device 20, but for example, as a facing direction of the second surface S32 which is the reflecting surface of the second prism 30 is changed, the image display device 80 may be disposed on a −Z side or a −Y side. Here, regarding the second surface S32, it is possible to form the second surface S32 which is a mirror film by aluminum evaporation or the like, and to make the second surface S32 function as the light reflecting surface. In addition, for example, a state which is configured by the polarization beam splitter (polarization separation element), other than the mirror film, is also possible. If the splitter portion SS is configured by the half mirror layer as illustrated in FIG. 1, it is possible to change the arrangement of the image display device 80 by changing the facing direction of the second surface S32 which is configured by the mirror film or a polarization separation film. However, for example, when the splitter portion SS is configured by the polarization separation element PS illustrated in FIG. 10, it is necessary to adjust the polarization state of the video light when the video light is incident on the polarization separation element PS, and it is necessary to take an appropriate measure corresponding to arrangement of the image display device 80, that is, the facing direction of the second surface S32, such as matching a state of the second surface S32 as the reflecting surface or a polarization state of the video light when the video light is emitted from the image display device 80.

In the above-described embodiment, the image display device 80 which is formed of the transmission type liquid crystal display device or the like is used, but instead, it is possible to use a scanning type image display device.

Figure 11:
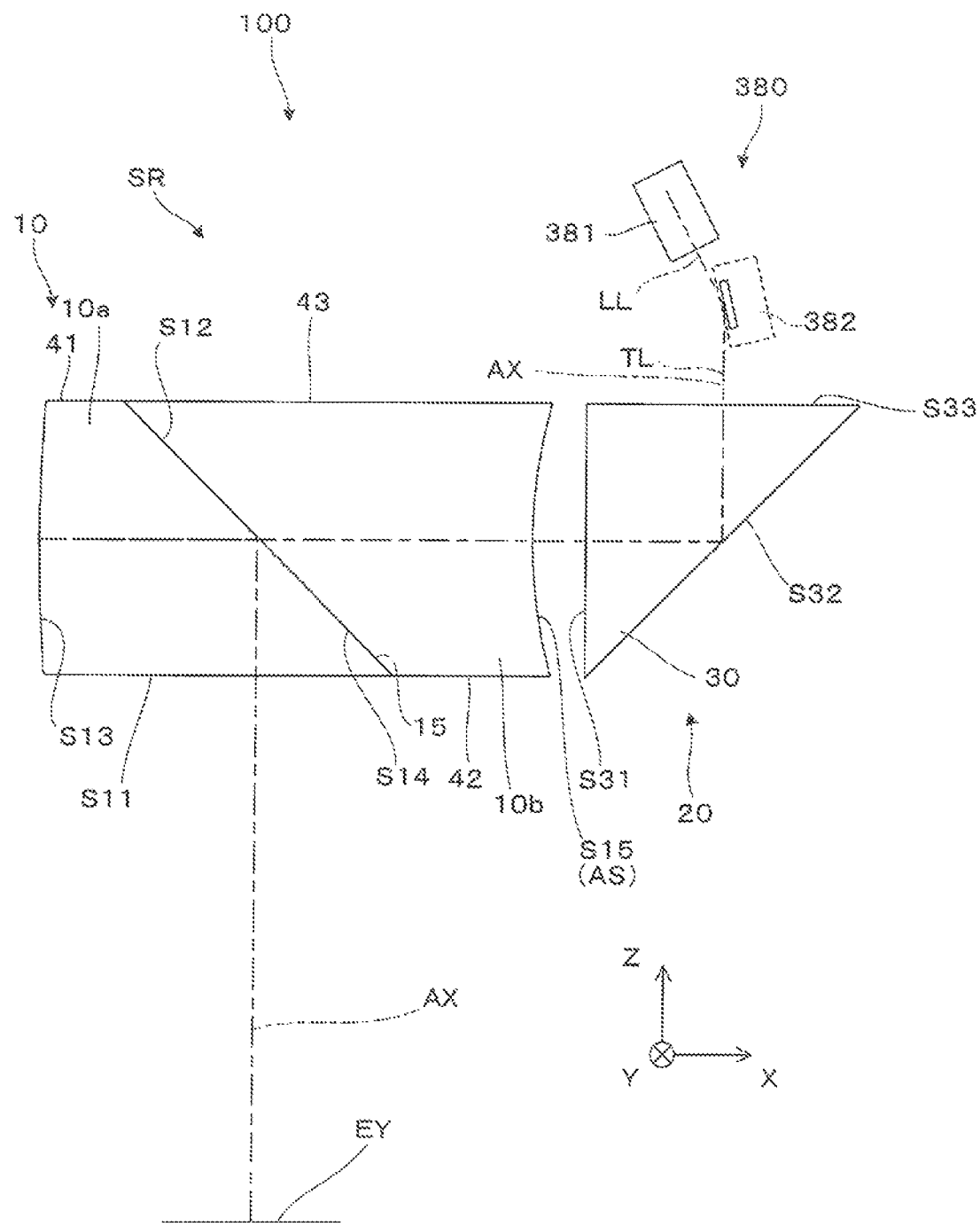
FIG. 11 is a view illustrating another modification example of the virtual image display apparatus.

Specifically, as illustrated in FIG. 11, the virtual image display apparatus 100 is provided with the light guiding device 20 and an image display device 380. Since the light guiding device 20 corresponds to a device configured by the first prism 10 and the second prism 30, the description thereof is omitted here. The image display device 380 is a device which forms an intensity-modulated signal light and emits the signal light as a scanning light TL, and has a signal light forming portion 381 and a scanning optical system 382.

The signal light forming portion 381 has the light source and emits a signal light LL which is formed to be modulated based on a control signal from a control circuit (not illustrated). The scanning optical system 382 scans and emits the signal light LL via the signal light forming portion 381. Here, the scanning optical system 382 is configured by an MEMS mirror or the like, and performs a two-dimensional scanning which changes an emission angle of the ray of light (scanning light TL) vertically and horizontally by changing a posture to be synchronized with the modulation of the signal light LL by the signal light forming portion 381 and adjusting the optical path of the signal light LL. According to the above, the image display device 380 causes the scanning light TL which is supposed to be the video light GL to be incident on the light guiding device 20.

When the operation of the virtual image display apparatus 100 illustrated in the drawing is described, as described above, the image display device 310 emits the signal light LL as the scanning light TL toward the third surface S13 which functions as the light incident surface of the light guiding device 20. The second prism 30 in the light guiding device 20 guides the scanning light TL on the inside and emits the light toward the first prism 10. Furthermore, the first prism 10 guides the scanning light TL on the inside and makes the light reach the half mirror layer 15. At this time, as the scanning light TL is scanned on a surface of the half mirror layer 15, a virtual image is formed by the video light GL as a track of the scanning light TL. As the wearer obtains the virtual image with the eyes EY, the image is recognized.

In the description above, the first prism 10 or the second prism 30 which is the light guiding member extends in a horizontal direction in which the eyes EY are aligned. However, it is possible to dispose each prism to be extended in a vertical direction. In this case, the first prism 10 or the like has a structure in which the prisms are disposed in parallel, not in series.

The entire disclosure of Japanese Patent Application No. 2013-252756, filed Dec. 6, 2013 is expressly incorporated by reference herein.

What is claimed is:

1. A virtual image display apparatus, comprising:
    a video element which generates video light;
    a splitter portion which transmits and reflects at least a part of the video light from the video element; and
    a light guiding member which has a light collecting mirror portion that collects the video light via the splitter portion and folds back the light to the splitter portion, and emits the video light via the splitter portion and the light collecting mirror portion to an observer side,
    wherein the light guiding member has at least one correction lens surface which corrects a chromatic aberration of magnification of the passed video light,
    wherein the light guiding member includes a prism having a first block part adjacent a second block part, the first and second block parts having, along an axis transverse to a direction of eyes of an observer, inclined surfaces facie each other, wherein the at least one correction lens surface is a side surface of the second block part having a spherical surface or aspherical surface of the prism with an opposite surface thereto of the prism along the axis being part of the first block part having a curved shape, and
    wherein the at least one correction lens surface being a light incident surface that causes video light from a second prism to be incident thereon and corrects the video light to correct the chromatic aberration of magnification.

2. The virtual image display apparatus according to claim 1,
    wherein the light guiding member is a prism type member having an optical transparency which bonds the splitter portion and the light collecting mirror portion to each other to be integrated.

3. The virtual image display apparatus according to claim 1,
    wherein the light guiding member directly guides the video light which is incident from a light incident surface, without reflecting the video light on the inside on the optical path until the video light reaches the light collecting mirror portion via the splitter portion from the light incident surface.

4. The virtual image display apparatus according to claim 1,
    wherein, in the light guiding member, the correction lens surface and a light reflecting surface of the light collecting mirror portion are surfaces which are symmetrical with respect to an optical axis.

5. The virtual image display apparatus according to claim 1, further comprising:
an intermediate light guiding member which is disposed between the video element and the light guiding member, causes the video light from the video element to be incident, guides the video light on the inside, and emits the video light toward the light guiding member.

6. The virtual image display apparatus according to claim 1,
wherein the light guiding member allows the observer to view the video light and external light.

7. The virtual image display apparatus according to claim 6, wherein
in the light guiding member, the splitter portion is disposed at the part in front of the eyes, and the light collecting mirror portion is disposed to nip the splitter portion between the video element and the light collecting mirror portion,
the splitter portion transmits at least a part of the video light from the video element and guides the light to the light collecting mirror portion,
the light collecting mirror portion folds back the incident video light to the splitter portion, and
the splitter portion reflects at least a part of the video light from the light collecting mirror portion, emits the light toward the eyes of the observer, transmits the external light, and allows the observer to view the video light and the external light.

8. The virtual image display apparatus according to claim 1,
wherein the light guiding member has the correction lens as a light emitting surface which emits the video light to the observer side.

9. The virtual image display apparatus according to claim 8, further comprising:
a visibility compensation element which is disposed facing a side far from the eyes of the observer with respect to the correction lens surface that functions as the light emitting surface of the light guiding member, and has an aspherical surface that offsets the visibility on the correction lens surface with respect to the external light.

10. The virtual image display apparatus according to claim 1,
wherein the splitter portion is a polarization separation element.

11. The virtual image display apparatus according to claim 1,
wherein the entire optical system, including the light guiding member, covers a part of the front of the eyes of the observer when the apparatus is mounted, and there exists a part in which the front of the eyes is not covered.

* * * * *